WILLIAM ANHEUSER, OF ST. LOUIS, MISSOURI.

Letters Patent No. 83,589, dated November 3, 1868; antedated October 28, 1868.

IMPROVEMENT IN EXTRACTING SACCHARINE MATTERS FROM MALT.

The Schedule referred to in these Letters Patent and making part of the same.

*To all whom it may concern:*

Be it known that I, WILLIAM ANHEUSER, of the city and county of St. Louis, and State of Missouri, have made new and useful Improvements in the Process of Extracting the Saccharine Liquid from Malt by pressure; and that the following is a full and exact description thereof, to wit:

The malt is brought into a tight compartment, into which I force a current of steam, water, or compressed air, by whose action the saccharine matter is pressed from the malt.

I furthermore attach a suction-apparatus to the lower part of the said compartment, to secure a ready issue of the liquid.

Now, be it known that, I do not claim the action of water or steam on malt, which is well known as a means of extraction; but

What I claim as my invention, and desire to secure by Letters Patent, is—

1. The process of forcing a direct current of steam, water, or compressed air into a tight compartment containing the malt, for the purpose of pressing the saccharine juice from the malt.

2. The application of a suction-apparatus to secure a ready issue of the saccharine liquid, either separate, or in combination with the device specified in the first claim.

WM. ANHEUSER.

Witnesses:
EDMUND F. SCHREINER,
MORITZ DIEDY.